Sept. 14, 1937.   S. MANDL   2,093,284
WORK ENGAGEMENT MEANS FOR JACKS
Filed June 27, 1936
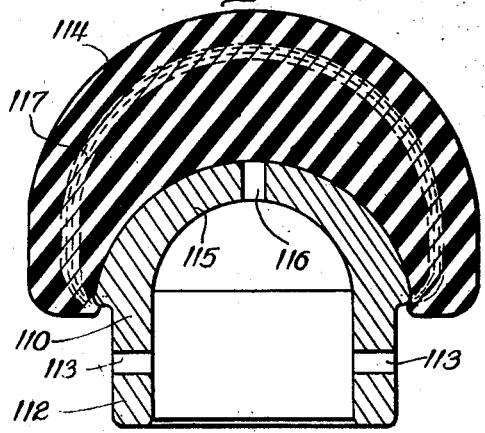
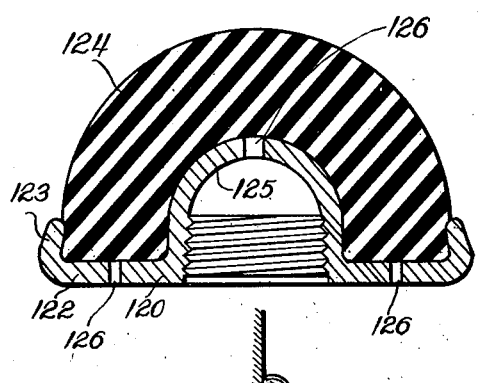
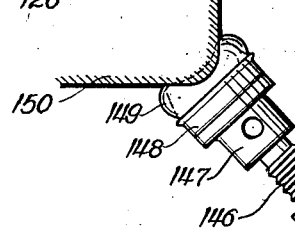
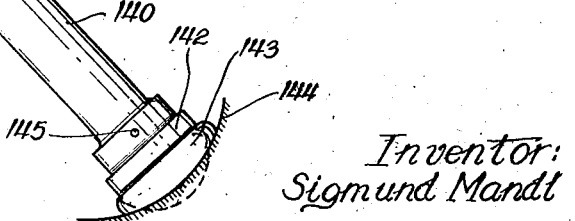
Inventor:
Sigmund Mandl Patented Sept. 14, 1937

2,093,284

UNITED STATES PATENT OFFICE 2,093,284

WORK ENGAGEMENT MEANS FOR JACKS

Sigmund Mandl, Milwaukee, Wis., assignor to Blackhawk Mfg. Co., Milwaukee, Wis., a corporation of Wisconsin Application June 27, 1936, Serial No. 87,652

3 Claims. (Cl. 153—32)

This invention relates to work engagement means for jacks, and more particularly is directed to work engaging attachments or pressure heads to be employed in connection with hydraulic jacks in the straightening of metal members, especially members having finished surfaces which must be protected against scratching or marring during the straightening thereof, or when used as reaction abutments in the straightening of adjacent members. The invention is particularly applicable in connection with the straightening of body members of automotive vehicles and the like.

The present invention contemplates generally certain improvements in construction and design of the appliance attachments, which are shown in detail in the copending application of Edward M. Pfauser, Serial No. 4,728, filed February 4, 1935, and is especially adapted to attachments employed in connection with the metal straightening machine therein disclosed. However, it is to be clearly understood that the invention is equally applicable to other types of quick detachable work or reaction engaging members used with pressure applying members, such as jacks, jack screws and the like.

In its preferred embodiment, the present invention contemplates the provision of an engaging pressure head having means whereby it can be attached to and detached from a jack or the like with facility, and which engages the work or reaction support in such manner as to prevent slippage with respect thereto, and to eliminate any possibility of denting, scratching, or otherwise marring the surface with which it is pressed into engagement.

It is essential, in connection with commercial adaptations of the present invention, that the engaging surface be compressible, in order to secure friction engagement and to conform in shape when pressed against corners or angle members. In addition, the present invention provides a contact surface which is preferably non-metallic and also non-abrasive, in order to preserve the surface against which it bears. The material employed for contact may comprise rubbers or plastics, with or without fabric or wire inserts, with or without fillers, such as hair, cotton, powdered wood, metal balls and the like, artificial or synthetic rubber, or may comprise hollow members filled with a powdered solid, liquid, or grease, or having a compressible gas pocket therein. Also, it appears that leather, canvas, cork, and other elastic materials could be employed either as fillers or as the contact surface. Preferably, rubber stock of a hardness such as used on rubber springs and bumpers in the automotive field apparently is well adapted to the present construction.

Resilient inserts such as rubber employed in pressure heads of the type disclosed can be of various shapes, and preferably are held in such manner in metal retainers as to prevent them from displacement therefrom.

Another object of the present invention is to provide a deformable contact surface that is compressible in conformance with the shape which it engages, and yet is restricted or restrained against flowing or spreading in such manner that the stress imposed thereon remains substantially entirely compressive, and directed at substantially right angles to the abutting surface. Thus the straight line thrust of the pressure applying means against the supporting members is retained, and the building up of any appreciable sidewise components of force tending to dislocate the head from the support is avoided. The material employed should have the characteristic also of returning to its original shape when the pressure is removed.

This retention of compression stress at right angles to the engaged surface, and the prevention of any substantial sidewise displacement of the compressible material is attained in the present invention in any desired manner. It may be accomplished by providing a peripheral metal retaining flange on the coupling member, preventing sidewise flow, by vulcanizing the material directly to the metal, or by means of friction, pins, screws, snap-rings, expansion plugs, or the like. Also, embedded fabric or wire material, such as beading members, may be employed, which restrains sidewise displacement of the resilient rubber head.

It will thus be apparent that the primary feature of the present invention is the provision of a plastic or deformable non-slipping pressure head firmly retained in the coupling member, which frictionally engages and conforms to the contour of the abutting reaction surface, and which is properly restrained against appreciable sidewise displacement so that the major stress is a compressive stress in a direction parallel to the applied force.

In the commercial development of the pressure heads or work engaging elements of the type disclosed in the present application, it is desirable that a number of such pressure heads, having various sizes and shapes, be employed for detachable connection to the pressure applying member, in order to provide a wide range of members suitable for engagement with the various contours of surfaces found in vehicle body parts, frame members, and the like. The present invention, although disclosing only a few of the various shapes that may be employed, is concerned primarily with the disclosure of characteristic types of shapes which may be employed, and the matter of relative sizes and degrees of curvature can be worked out in connection with the particular pressure applying member and the work which is to be performed.

The pressure head, regardless of its shape or manner of attachment to the coupling, should be of a relatively large volume of deformable material, as distinguished from merely a pad member laid over the external surface of the coupling, inasmuch as one of the essential characteristics of the present invention is a head which increases its surface area of contact as the pressure builds up, so that the unit pressure is retained low upon relatively large increases in pressure due to the fact that the head spreads over and tends to assume the shape of the contacted surface. I have found that pressure heads of the type disclosed herein, when subject to pressures of from six to seven tons, still retain their desirable characteristics and readily return to their original shapes upon release of the pressure.

Other objects and advantageous features of the present invention will appear more fully from the following detailed description which, taken in conjunction with the accompanying drawing, will disclose to those skilled in the art the particular construction and operation of preferred forms of the present invention.

In the drawing:

Figure 1 illustrates one form of pressure head that may be employed in practicing my invention;

Figure 2 illustrates a modification of the pressure head shown in Figure 1; and

Figure 3 shows how the pressure heads illustrated in Figures 1 and 2 may be used with a jack to straighten deformed metal parts.

Figure 1 discloses a construction which materially reduces the weight of the coupling member, since this member indicated at 110, is of relatively small volume, being in the form of a cup-shaped shell having the socket portion 112 provided with opposed openings 113 for receiving a locking pin 113 to secure the member 110 to a pressure developing member.

The resilient pressure head 114, which is of spherical shape and uniform in section encloses the dome portion 115 of the member 110, and is suitably vulcanized, in the case of rubber, to the external surface of the portion 115. A suitable opening 116 in the dome allows for escape of trapped air when the head 114 is moved into position. Preferably the member 114 is provided with fabric or equivalent beading, as indicated at 117, to restrain lateral deformation and to hold the head more firmly in position. This type of head can of course be made with several different radii depending upon the surfaces with which it is to be brought into contact, and I have found it to work effectively on either concave surfaces or in wedge shaped corners or surfaces. When the resilient pressure head 114 is formed of rubber and is vulcanized onto the dome or convex portion 115 of the coupling member 110, there is a more complete distribution of stress throughout the pressure head with the result that all of the material forming it is substantially stressed, rather than the portion interposed directly between the coupling member 110 and the work engaged by the pressure head.

In Figure 2 I have disclosed a modification of the assembly shown in Figure 1, the coupling member 120 being provided with a radial flange 122 terminating in an annular slightly inwardly tapered lip 123. The member 120 may be detachably secured to a pressure developing member in any desired manner.

The head 124 of this embodiment is preferably of rubber, of uniform section, which is pressed about the dome 125 and into the annular channel surrounding the dome. Suitable displacement openings 126 are formed in the channel and the dome to prevent entrapment of air, and the head may be held in place merely by the wedging action of the lip 123, or may be vulcanized to the member 120, as desired.

Both of the embodiments of Figures 1 and 2 provide a pressure head which has a uniform resilient section and which allows a considerable reduction in the weight of the detachable coupling. It will be noted that the thickness of the resilient pressure head 114, Figure 1 decreases from a maximum at the center of the dome or convex portion 115 to a minimum at its edges. Furthermore, it will be observed, with reference to both Figures 1 and 2, that the centers of curvature of the outer surfaces of the pressure heads 114 and 124 fall within the dome or convex portions 115 and 125, respectively, whereby they are more fully capable of resisting angularly imposed stresses.

In Figure 3 I have disclosed a screw jack having the base portion 140 carrying a detachable coupling member 142 provided with a resilient pressure head 143 adapted to engage a reacting surface 144. The normal position of the head is shown in dotted lines and its deflected position under pressure is shown in full lines. This pressure head and coupling member may preferably be similar to that shown in Figure 1, being detachably held on the jack by the pin 145.

The threaded shaft 146 of the jack carries the integral collar portion 147 apertured to receive suitable means for rotating it toward and away from the base 140. At its outer end, the shaft 146 may have means for detachably receiving in swivelled connection therewith a coupling member 148 carrying a pressure head 149 similar to the head 133 and shown in dotted lines in normal position and in full lines in deformed position when pressure is applied to the surface 150. The heads 143 and 149 frictionally grip the surfaces 144 and 150, and prevent slipping of the jack or rotation of the base 140 or the swivelly mounted coupling 148 when shaft 146 is threaded outwardly.

It will therefore be apparent that the present invention is capable of many modifications and changes in design, and it is not intended that the illustrated embodiments disclose anything but several of the preferred manners in which the pressure head and attachment members may be formed.

I do not intend to be limited to the exact shapes or manners of attachment of the pressure heads to the coupling members as illustrated, nor to the particular type of coupling members disclosed, since it is apparent that the invention is capable of a wide range of modifications. It is therefore intended that the illustrated embodiments of the invention serve as illustrative only of various features of the invention, and that the invention be limited only as defined by the scope and spirit of the appended claims.

I claim:

1. Apparatus for use in bending sheet metal members and the like to restore them to substantially their original shapes comprising, in combination, a pressure applying strut member, means on the outer end of said strut member providing a convex surface, and a unitary rubber pressure applying head entirely covering and intimately bonded to said convex surface, said rubber pressure applying head being generally semi-spherically shaped and having its center of curvature lying below said convex surface.

2. A pressure member for use in bending distorted sheet metal members and the like to restore them to substantially their original shapes comprising, in combination, a metal fitting having means at one end for mounting on metal bending pressure applying means and having a convex portion at the other end, and a unitary rubber pressure applying head entirely covering and intimately secured to the surface of said convex end portion, said rubber pressure applying head being generally semi-spherically shaped and having its center of curvature lying below said surface of said convex end portion.

3. A pressure member for use in bending distorted sheet metal members and the like to restore them to substantially their original shapes comprising, in combination, a metal fitting having a socket at one end for mounting on metal bending pressure applying means and having a convex portion at the other end, and a unitary rubber pressure applying head covering and intimately secured to the surface of said convex end portion of said fitting, said rubber pressure applying head being generally semi-spherically shaped and having its center of curvature lying below said surface of said convex end portion.

SIGMUND MANDL.